United States Patent
Paterson, Jr.

(10) Patent No.: US 11,235,931 B2
(45) Date of Patent: Feb. 1, 2022

(54) CONVEYOR CART ALIGNMENT SYSTEMS AND METHODS

(71) Applicant: The Raymond Corporation, Greene, NY (US)

(72) Inventor: Robert J. Paterson, Jr., Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 124 days.

(21) Appl. No.: 16/834,630

(22) Filed: Mar. 30, 2020

(65) Prior Publication Data
US 2020/0317448 A1 Oct. 8, 2020

Related U.S. Application Data

(60) Provisional application No. 62/830,314, filed on Apr. 5, 2019.

(51) Int. Cl.
*B65G 1/137* (2006.01)
(52) U.S. Cl.
CPC .................................. *B65G 1/1375* (2013.01)
(58) Field of Classification Search
CPC .................................................... B65G 1/1375
See application file for complete search history.

(56) References Cited

U.S. PATENT DOCUMENTS

| | | | |
|---|---|---|---|
| 3,815,084 A | 6/1974 | Pease | |
| 4,792,995 A * | 12/1988 | Harding | H04B 10/801 398/109 |
| 4,944,357 A * | 7/1990 | Wible | B60T 1/16 180/169 |
| 5,202,832 A * | 4/1993 | Lisy | G05D 1/0236 414/343 |
| 5,664,929 A * | 9/1997 | Esaki | B60L 50/60 414/398 |
| 10,048,697 B1 * | 8/2018 | Theobald | B65G 41/008 |
| 2018/0169944 A1 | 6/2018 | Hofmann | |
| 2019/0135551 A1 * | 5/2019 | Sekich | B65G 47/34 |

FOREIGN PATENT DOCUMENTS

| | | |
|---|---|---|
| EP | 0035890 | 9/1981 |
| JP | S5922825 | 6/1984 |

OTHER PUBLICATIONS

European Patent Office. Extended European Search Report for application EP20167284.7, dated Aug. 26, 2020.

\* cited by examiner

*Primary Examiner* — Kyle O Logan
(74) *Attorney, Agent, or Firm* — Quarles & Brady LLP (57) ABSTRACT

An alignment and task indication system is provided. The alignment and task indication system includes a conveyor cart having a first cart sensor, a second cart sensor, a first cart reflector, and a second cart reflector, and a stationary conveyor including a stationary sensor and a stationary reflector. The first cart sensor and the second cart sensor are attached to a first side of the conveyor cart and the first cart reflector and the second cart reflector are attached to a second opposite side of the conveyor cart. The first cart sensor and the first cart reflector are arranged at a first height and the second cart sensor and the second cart reflector are arranged at a second height.

20 Claims, 7 Drawing Sheets

CONVEYOR CART ALIGNMENT SYSTEMS AND METHODS

CROSS-REFERENCES TO RELATED APPLICATIONS

The present disclosure is based on and claims priority to U.S. Provisional Patent Application No. 62/830,314, filed on Apr. 5, 2019, and entitled "Conveyor Cart Alignment Systems and Methods."

STATEMENT REGARDING FEDERALLY SPONSORED RESEARCH

Not Applicable.

BACKGROUND

Conveyor carts may be attached to a material handling vehicle, or another movable vehicle, within a warehouse. The conveyor carts may transfer loads to and from a stationary conveyor during operation.

BRIEF SUMMARY

The present disclosure provides systems and methods for an alignment and task indication on conveyor carts and stationary conveyors.

In one aspect, the present disclosure provides alignment and task indication system including a conveyor cart including a first cart sensor, a second cart sensor, a first cart reflector, and a second cart reflector. The first cart sensor and the second cart sensor are attached to a first side of the conveyor cart and the first cart reflector and the second cart reflector are attached to a second opposite side of the conveyor cart. The first cart sensor and the first cart reflector are arranged at a first height and the second cart sensor and the second cart reflector are arranged at a second height. The alignment and task indication system further includes a stationary conveyor having a stationary sensor and a stationary reflector. Alignment of the stationary sensor with one of the first cart reflector and the second cart reflector and simultaneous alignment of the stationary reflector with one of the first cart sensor and the second cart sensor is configured to confirm alignment between the conveyor cart and the stationary conveyor. The one of the first cart sensor and the second cart sensor aligned with the stationary reflector is configured to determine if the stationary conveyor is an unloading location or a loading location.

In one aspect, the present disclosure provides an alignment and task indication system including a conveyor cart including a plurality of conveyor cart rollers, a first cart sensor, a second cart sensor, a first cart reflector, and a second cart reflector. The first cart sensor and the second cart sensor are attached to a first side of the conveyor cart and the first cart reflector and the second cart reflector are attached to a second opposite side of the conveyor cart. The first cart sensor and the first cart reflector are arranged at a first height and the second cart sensor and the second cart reflector are arranged at a second height. The alignment and task indication system further includes a stationary conveyor having a plurality of stationary conveyor rollers, a stationary sensor, and a stationary reflector. Alignment of the stationary sensor with one of the first cart reflector and the second cart reflector and simultaneous alignment of the stationary reflector with one of the first cart sensor and the second cart sensor is configured to confirm alignment between the conveyor cart and the stationary conveyor. The one of the first cart sensor and the second cart sensor aligned with the stationary reflector is configured to determine a rotational direction that the plurality of conveyor cart rollers and the plurality of stationary conveyor rollers rotate.

In one aspect, the present disclosure provides a method of operating a movable conveyor. The movable conveyor including a plurality of conveyor rollers, a first cart sensor, a second cart sensor, a first cart reflector, and a second cart reflector. The first cart sensor and the first cart reflector being arranged at a first height and the second cart sensor and the second cart reflector being arranged at a second height. The method including moving the movable conveyor into alignment with a stationary conveyor. The stationary conveyor including a stationary sensor and a stationary reflector arranged on opposing sides thereof. The method further includes determining which of the first cart sensor or the second cart sensor is aligned with the stationary reflector, upon determining that the first cart sensor is aligned with the stationary reflector, rotating the plurality of conveyor rollers in a first direction, and upon determining that the second cart sensor is aligned with the stationary reflector, rotating the plurality of conveyor rollers in a second direction.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Figure 1:
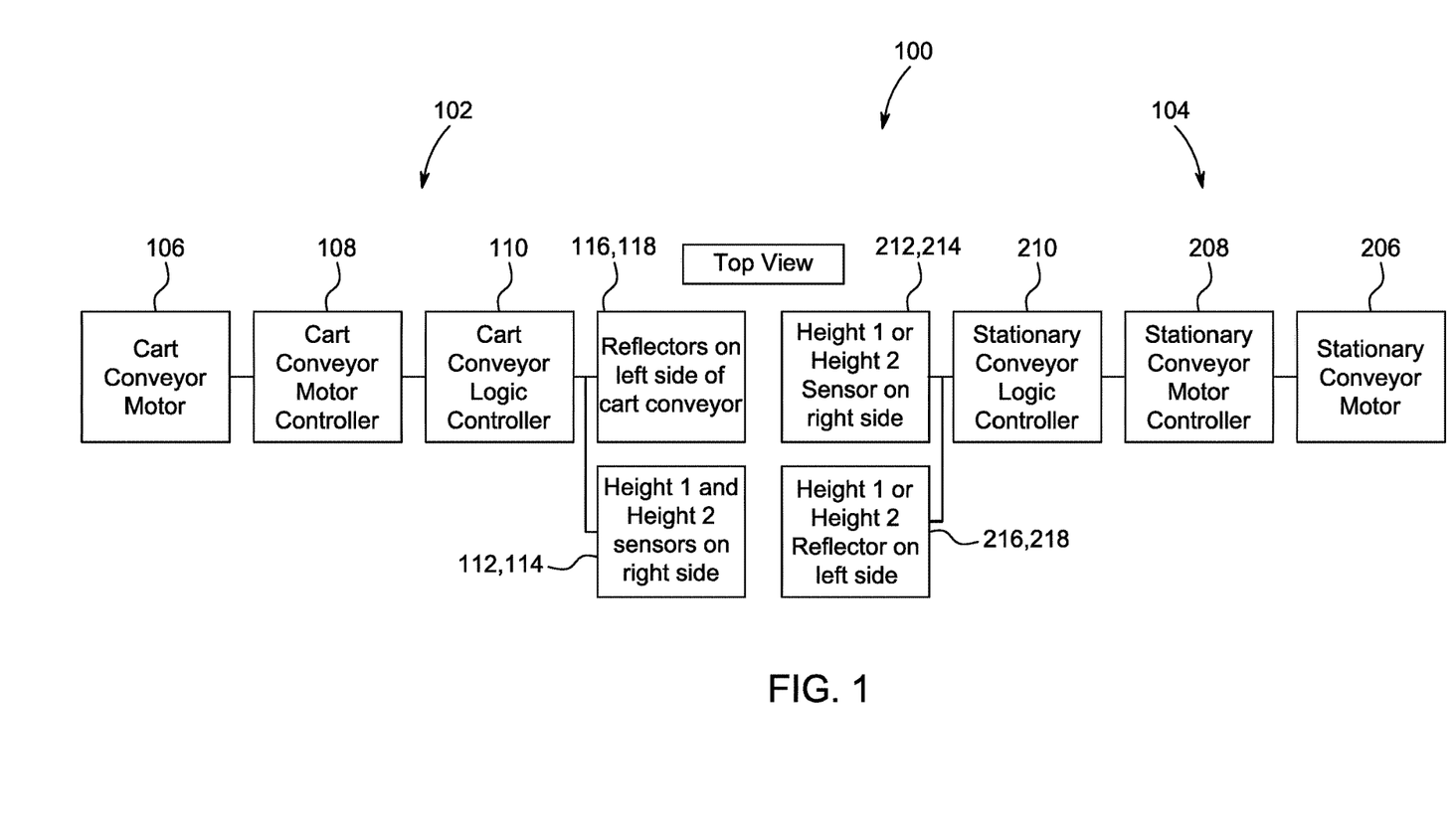
FIG. 1 is a schematic illustration of a top view of an alignment and task indication system according to one aspect of the present disclosure.

FIG. 1 illustrates one non-limiting example of an alignment and task indication system 100 according to the present disclosure. In the illustrated non-limiting example, the alignment and task indication system 100 may be installed on a conveyor cart 102 and a stationary conveyor 104. The conveyor cart 102 may be attached to a material handling vehicle (MHV), for example, a tugger, to enable the conveyor cart 102 to be moved around a material handling environment (e.g., a warehouse). In other words, the conveyor cart 102 may be mobile and may move throughout the warehouse to interact with different stationary conveyors. The conveyor cart 102 may be configured to receive and drop off loads via rotation of rollers on the cart in a desired direction. For example, the rollers may be instructed to rotate in one direction to receive a load (e.g., a pallet) and instructed to rotate in another direction to drop off a load.

The conveyor cart 102 may include a conveyor cart motor 106, a conveyor cart motor controller 108 in communication with the conveyor motor 106, a conveyor cart logic controller 110, a first cart sensor 112, a second cart sensor 114, a first cart reflector 116, and a second cart reflector 118. The conveyor cart motor 106 may be configured to control the rotational speed and direction of rotation of the rollers on the conveyor cart 102. The conveyor cart motor controller 108 may be configured to instruct the conveyor motor 106 to rotate the rollers in a desired direction at a desired speed.

The conveyor cart logic controller 110 may be configured to provide feedback from the first cart sensor 112 and the second sensor 114 to the conveyor cart motor controller 108. Based on the feedback from the first cart sensor 112 and the second sensor 114, the conveyor cart motor controller 108 may decide whether or not to rotate, via the conveyor cart motor 106, the rollers in a desired direction at a desired speed.

The first cart sensor 112 and the second cart sensor 114 may be attached to a first side (e.g., a right side) of the conveyor cart 102, with the first cart senor 112 being laterally aligned with the second cart sensor 114 and spaced vertically (e.g., in a direction perpendicular to a floor on which the conveyor cart 102 travels). That is, the first cart sensor 112 may be arranged at a first height (e.g., relative to a floor on which the conveyor cart 102 travels), and the second cart sensor 114 may be arranged at a second height. In the illustrated example, the first and second cart sensors 112, 114 may be arranged on a first side of conveyor cart 102, and the first cart reflector 116 and the second cart reflector 118 may be arranged on a second side (e.g., a left side) of the conveyor cart 102. The first cart reflector 116 may be arranged at the same vertical height as the first cart sensor 112, and the second cart reflector 118 may be arranged at the same vertical height as the second cart sensor 114. In some examples, the first and second cart sensors 112, 114 may be retroreflective sensors, where the emitters are mounted on the conveyor cart 102 and configured to emit a signal that is detected once it is aligned with a reflector.

During operation, the conveyor cart 102 may interface with one or more stationary conveyors, which are designated as either pick-up locations where a load is transferred from the stationary conveyor 104 to the conveyor cart 102, or drop-off locations where a load is transferred from the conveyor cart 102 to the stationary conveyor 104. The stationary conveyor 104 may include similar components as the conveyor cart 102, which are identified using like reference numerals in the 200's. As illustrated in FIG. 1, the stationary conveyor 104 may include either a first stationary sensor 212 and a first stationary reflector 216 arranged at the first height, or a second stationary sensor 214 and a second stationary reflector 218 arranged at the second height. The stationary sensor and reflector may be arranged on opposing sides of the stationary conveyor 104, so that, when the conveyor cart 102 and the stationary conveyor 104 are aligned, the sensors on the conveyor cart 102 align with a corresponding reflector on the stationary conveyor 104, and the sensor on the stationary conveyor 104 aligns with a corresponding reflector on the conveyor cart 102.

Figure 2:
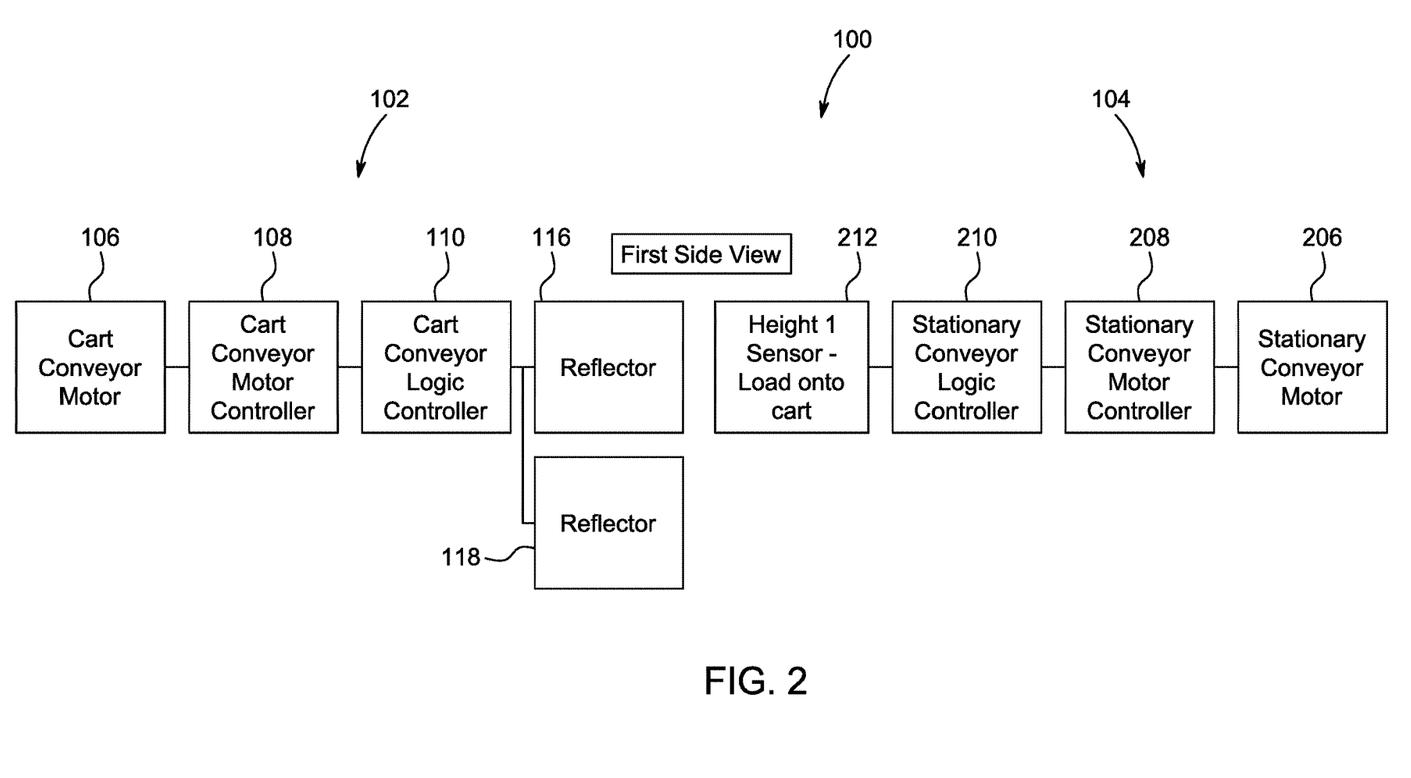
FIG. 2 is a schematic illustration of a first side view of the alignment and task indication system of FIG. 1 with a stationary sensor at a first height according to one aspect of the present disclosure.
Figure 3:
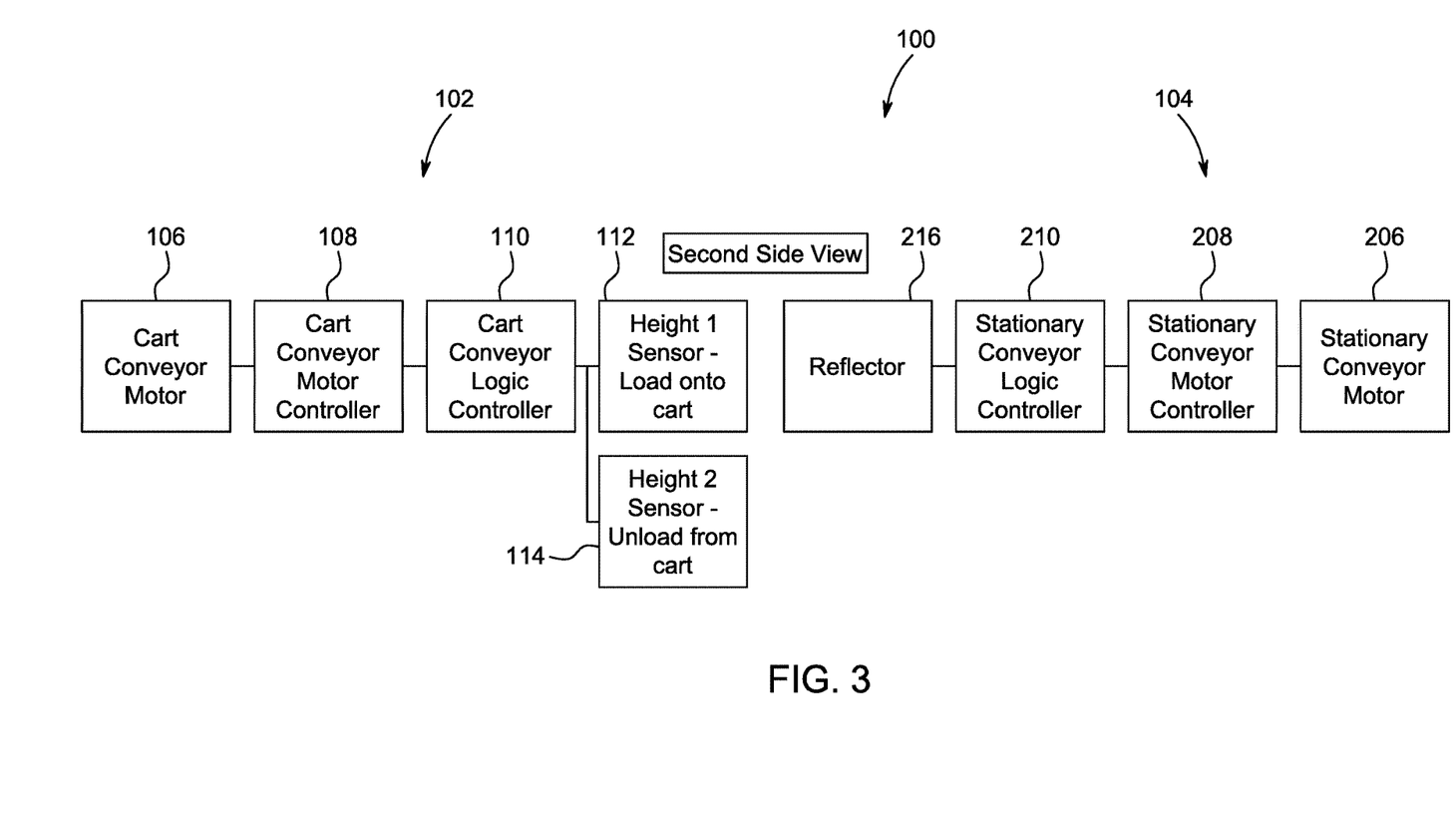
FIG. 3 is a schematic illustration of a second side view of the alignment and task indication system of FIG. 2.

The arrangement and functionality of the sensors/reflectors on the stationary conveyor 104 and the conveyor cart 102 may provide an indication that the carts are aligned and what task is to be performed (e.g., unload from conveyor cart 102 or load onto the conveyor cart 102). FIGS. 2 and 3 illustrate a non-limiting example of the conveyor cart 102 being aligned with a stationary conveyor 104 that is designated as a loading station (i.e., loading onto the conveyor cart 102). As illustrated, the stationary conveyor 104 may be provided with the first stationary sensor 212 and the first stationary reflector 216. In this way, for example, once the first cart sensor 112 aligns with the first stationary reflector 216, and the first stationary sensor 212 aligns with the first cart reflector 116, the conveyor cart logic controller 110 may know that the conveyor cart 102 and the stationary conveyor 104 are aligned and ready to perform a task. In addition, with the stationary conveyor 104 only including the first stationary sensor 212 and the first stationary reflector 216, the second cart sensor 114 may not align with a corresponding reflector and may be blocked (e.g., a beam emitted therefrom may not be aligned with a reflector). The condition of having the first cart sensor 112 aligned with a reflector and the second cart sensor 114 blocked may indicate to the conveyor cart logic controller 110 that the conveyor cart 102 has arrived at a loading stationary conveyor 104. The conveyor cart logic controller 110 may then instruct the conveyor cart motor controller 108 to rotate the rollers in a first direction to receive a load from the stationary conveyor 104 (i.e., a load may be transferred from the stationary conveyor 104 to the conveyor cart 102).

In some non-limiting examples, the conveyor cart 102 and the stationary controller 104 may be in communication with a system controller (e.g., a warehouse management system). When the system controller receives the indication that the conveyor cart 102 and the stationary conveyor 104 are aligned and ready to load onto the conveyor cart 102, the system controller may provide instructions to the conveyor cart 102 and the stationary conveyor 104 to move the rollers thereof in a desired direction to transfer a load from the stationary conveyor 104 to the conveyor cart 102.

Figure 4:
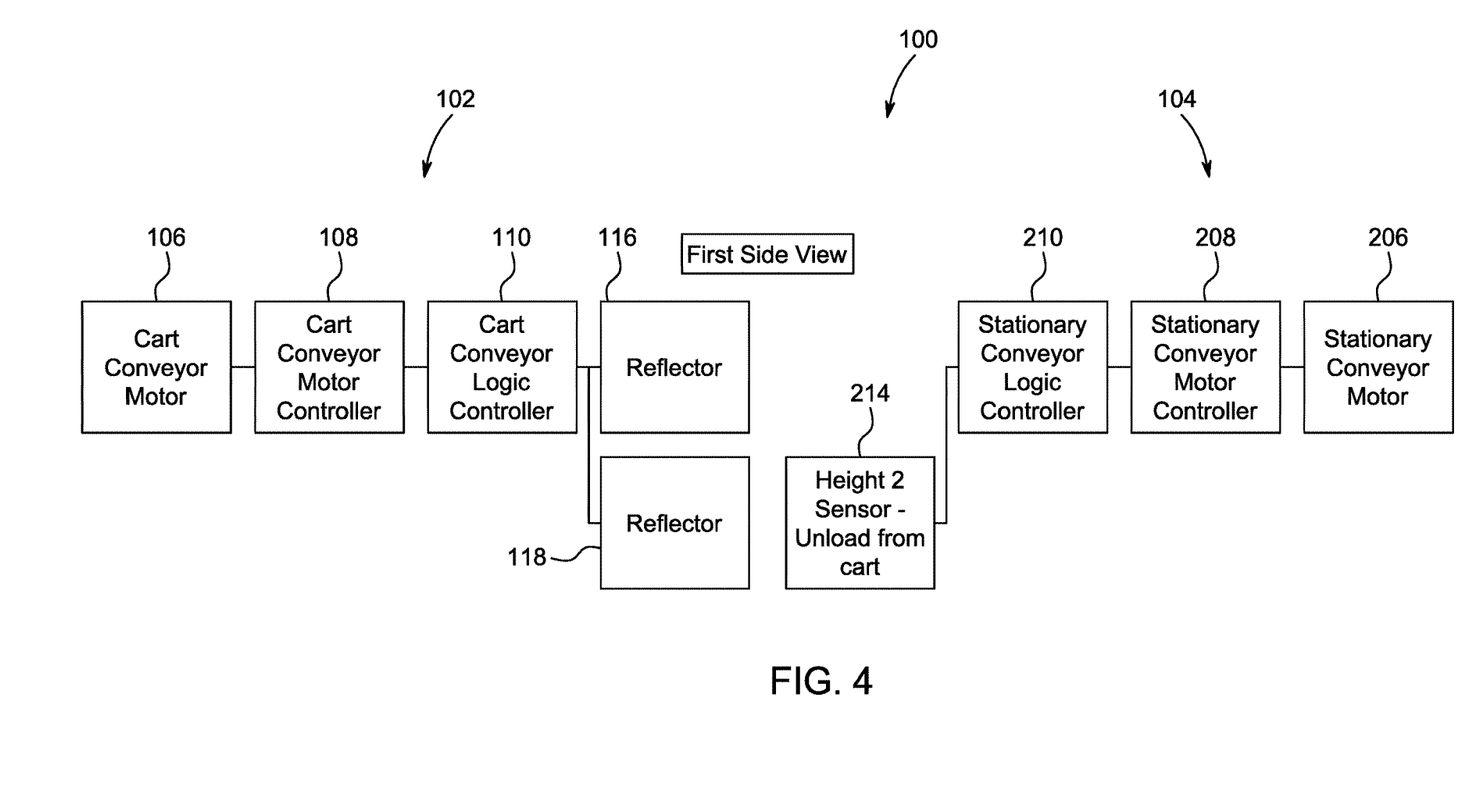
FIG. 4 is a schematic illustration of a first side view of the alignment and task indication system of FIG. 1 with a stationary sensor at a second height according to one aspect of the present disclosure.
Figure 5:
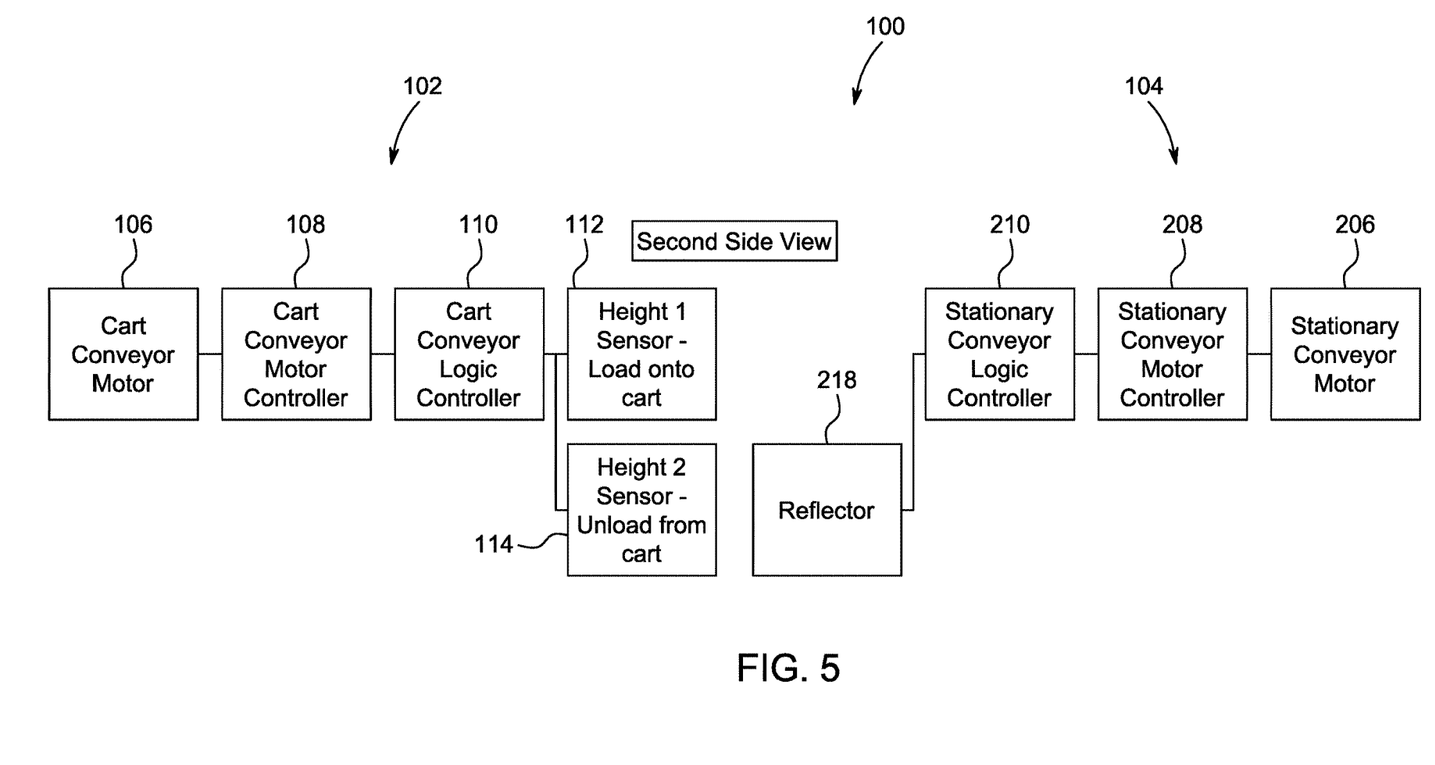
FIG. 5 is a schematic illustration of a second side view of the alignment and task indication system of FIG. 4.

FIGS. 4 and 5 illustrate a non-limiting example of the conveyor cart 102 being aligned with a stationary conveyor 104 that is designated as an unloading station (i.e., unloading onto the stationary conveyor 104). As illustrated, the stationary conveyor 104 may be provided with the second stationary sensor 212 and the second stationary reflector 218. In this way, for example, once the second cart sensor 114 aligns with the second stationary reflector 218, and the second stationary sensor 214 aligns with the second cart reflector 118, the conveyor cart logic controller 110 may know that the conveyor cart 102 and the stationary conveyor 104 are aligned and ready to perform a task. In addition, with the stationary conveyor 104 only including the second stationary sensor 214 and the second stationary reflector 218, the first cart sensor 112 may not align with a corresponding reflector and may be blocked. The condition of having the second cart sensor 114 aligned with a reflector and the first cart sensor 112 blocked may indicate to the conveyor cart logic controller 110 that the conveyor cart 102 has arrived at an unloading stationary conveyor 104. The conveyor cart logic controller 110 may then instruct the conveyor cart motor controller 108 to rotate the rollers in a second direction to unload a load onto the stationary conveyor 104 (i.e., a load may be transferred from the conveyor cart 102 to the stationary conveyor 104).

In some non-limiting examples, the conveyor cart 102 and the stationary controller 104 may be in communication with a system controller (e.g., a warehouse management system). When the system controller receives the indication that the conveyor cart 102 and the stationary conveyor 104 are aligned and ready to unload from the conveyor cart 102 to the stationary conveyor 104, the system controller may provide instructions to the conveyor cart 102 and the stationary conveyor 104 to move the rollers thereof in a desired direction to transfer a load from the conveyor cart 102 to the conveyor cart 104.

Figure 6:
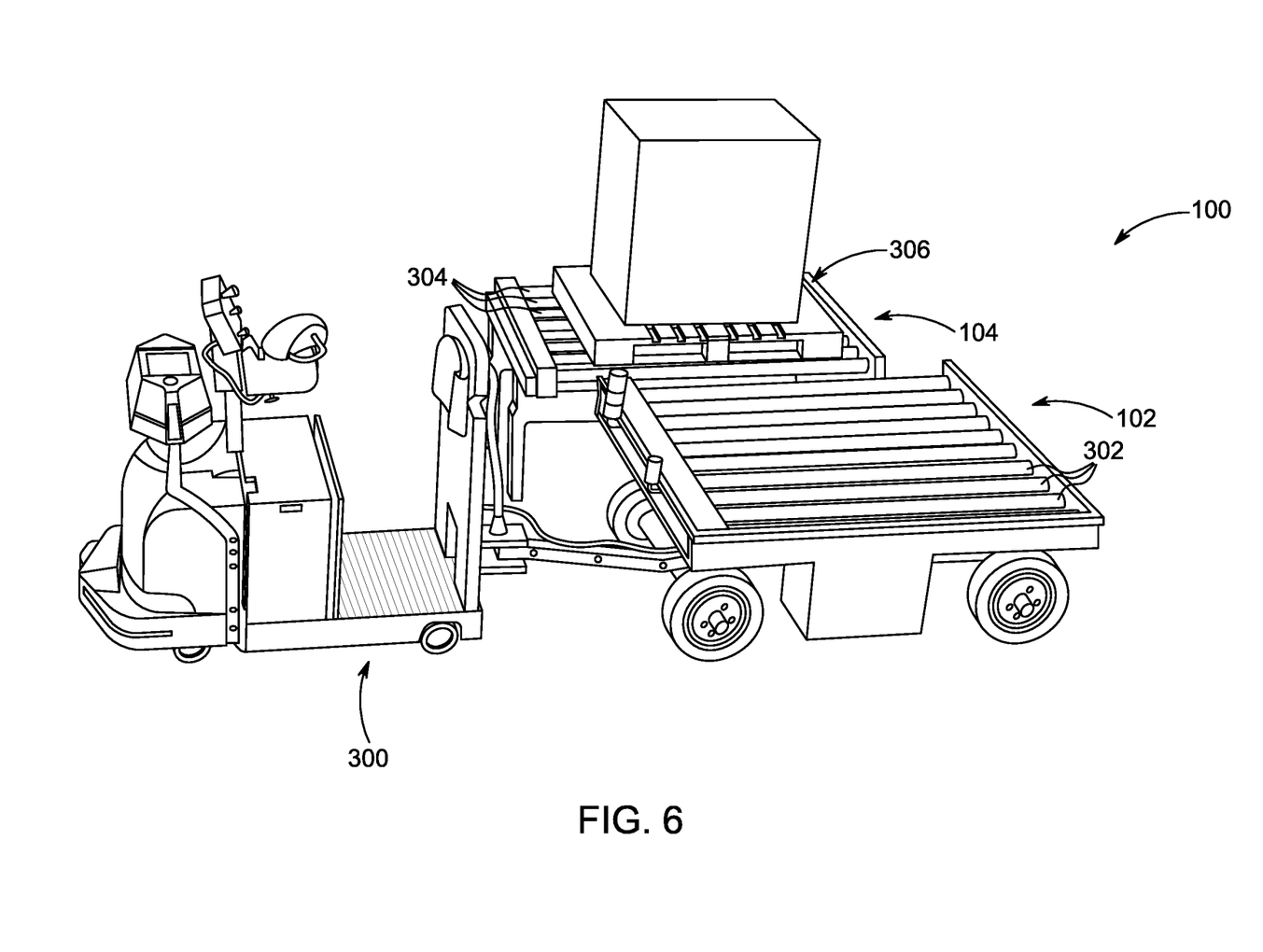
FIG. 6 is a perspective view of a material handling vehicle towing a conveyor cart that is interacting with a stationary conveyor, where the conveyor cart and the stationary conveyor include the alignment and task indication system of FIGS. 1-5.

FIG. 6 illustrates one non-limiting example of the conveyor cart 102 and the stationary conveyor 104. As illustrated in FIG. 6, the conveyor cart 102 may be attached to a material handling vehicle 300, for example, in the form of a tugger of a tow tractor. As described herein, each of the conveyor cart 102 and the stationary conveyor 104 may include a plurality of rollers that are selectively rotatable via a motor. For example, the conveyor cart 102 may include a plurality of conveyor cart rollers 302 that are coupled to the cart conveyor motor 106, and the stationary conveyor 304 may include a plurality of stationary conveyor rollers 304 that are coupled to the stationary conveyor motor 206. In the illustrated non-limiting example, the stationary conveyor 104 may be supporting a load 308 and the material handling vehicle 200 is moving the conveyor cart 102 into alignment with the stationary conveyor 104.

Figure 7:
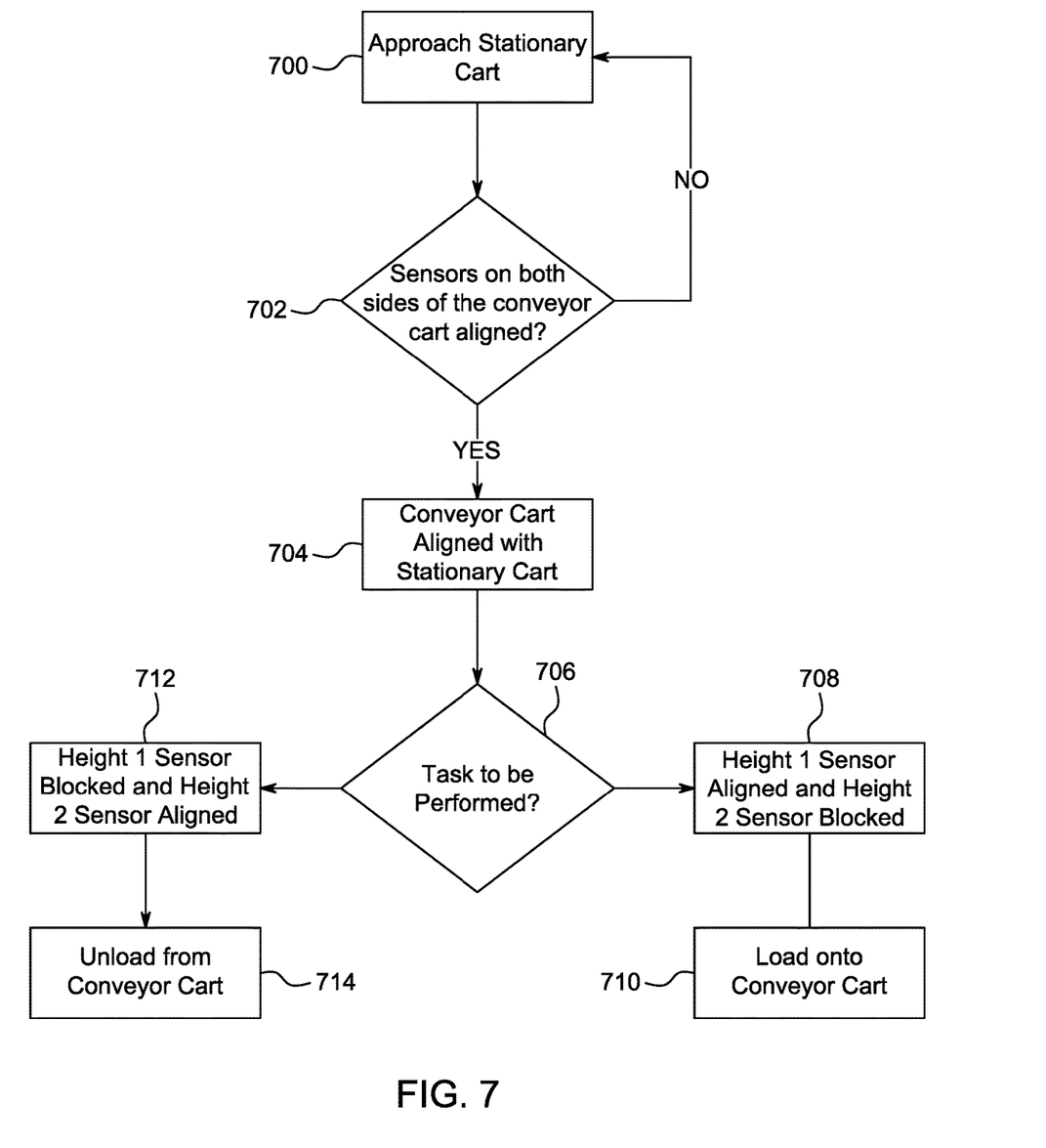
FIG. 7 is a flowchart illustrating one non-limiting example of the steps for operating the alignment and task indication system of FIGS. 1-5.

With reference to FIGS. 6 and 7, the alignment and task indication system 100 may be utilized in this non-limiting application to efficiently determine when the conveyor cart 102 is align with the stationary conveyor 104 and what task is to be performed (e.g., loading onto the conveyor cart 102 or unloading from the conveyor cart 102). With specific reference to FIG. 7, at step 700, the conveyor cart 102 may approach the stationary conveyor 104 (see FIG. 6) via the attachment to the material handling vehicle 300. As the conveyor cart 102 approaches the stationary conveyor 104, the system controller (e.g., the warehouse management system) or another global controller that is wirelessly in communication with both of the cart conveyor logic controller 110 and the stationary conveyor logic controller 210, may monitor the first cart sensor 112, the second cart sensor 114, the first stationary conveyor sensor 212, and the second stationary conveyor sensor 214 to determine, at step 702, when the conveyor cart 102 is aligned with the stationary conveyor 104. For example, to determine at step 702 that the conveyor cart 102 is aligned with the stationary conveyor 104, at least one of the first cart sensor 112 and the second cart sensor 114 may be aligned with a corresponding reflector on the stationary conveyor 104 and at least one of the first stationary sensor 212 and the second stationary sensor 214 may be aligned with a corresponding reflector on the conveyor cart 102. In other words, at least one sensor on opposing sides of the conveyor cart 102 and the stationary conveyor 104 may be simultaneously aligned to confirm alignment between the conveyor cart 102 and the stationary conveyor 104 at step 704. In some non-limiting examples, the system controller (e.g., the warehouse management system) or the global controller may provide an indication of alignment between the conveyor cart 102 and the stationary conveyor 104 prior to proceeding to task determination. If the conditions to confirm alignment are not met at step 702, the conveyor cart 102 may continue to approach the stationary conveyor 104.

Once the alignment is confirmed between the conveyor cart 102 and the stationary conveyor 104, the system controller (e.g., the warehouse management system) or another global controller that is wirelessly in communication with both of the cart conveyor logic controller 110 and the stationary conveyor logic controller 210 may determine the task to be performed at step 706 by monitoring the status of each of the first cart sensor 112, the second cart sensor 114, the first stationary conveyor sensor 212, and the second stationary conveyor sensor 214. For example, at step 708, the first cart sensor 112, which is arranged at a first height, may be aligned with a reflector (e.g., the first stationary reflector 216) and the second cart sensor 114, which is arranged at a second height, may be blocked (i.e., not aligned with a reflector). With the first cart sensor 112 aligned and the second cart sensor 114 blocked, the conveyor logic controller 110 may be configured to determine that the stationary conveyor 104, which the conveyor cart 102 is aligned with, is a loading station where a pallet or load is present on the stationary conveyor 104. In this scenario, the conveyor logic controller 110 may be configured to instruct the cart conveyor motor controller 108 to rotate the conveyor cart rollers 302, via the cart conveyor motor 106, to receive a load onto the conveyor cart 102 at step 710.

Similarly, at step 708, the first stationary sensor 212, which is arranged at a first height, may be aligned with a reflector (e.g., the first cart reflector 116) and the second stationary sensor 214, which is arranged at a second height, may be blocked (i.e., not aligned with a reflector). With the first stationary sensor 212 aligned and the second cart sensor 214 blocked, the stationary logic controller 210 may be configured to determine that the conveyor cart 102, which the stationary conveyor 104 is aligned with, is empty and is ready to receive a pallet or load that present on the stationary conveyor 104. In this scenario, the stationary logic controller 210 may be configured to instruct the stationary conveyor motor controller 208 to rotate the stationary conveyor rollers 304, via the stationary conveyor motor 206, to unload a load onto the conveyor cart 102 at step 710.

Alternatively, at step 712, the first cart sensor 112, which is arranged at a first height, may be blocked (i.e., not aligned with a reflector) and the second cart sensor 114, which is arranged at a second height, may be aligned with a reflector (e.g., the second stationary reflector 218). With the second cart sensor 114 aligned and the first cart sensor 112 blocked, the conveyor logic controller 110 may be configured to determine that the stationary conveyor 104, which the conveyor cart 102 is aligned with, is an unloading station where a pallet or load is present on the conveyor cart 102 and the stationary conveyor 104 is empty. In this scenario, the conveyor logic controller 110 may be configured to instruct the cart conveyor motor controller 108 to rotate the conveyor cart rollers 302, via the cart conveyor motor 106, to transfer a load from the conveyor cart 102 to the stationary conveyor 104 at step 714.

Similarly, at step 712, the first stationary sensor 212, which is arranged at a first height, may be blocked (i.e., not aligned with a reflector) and the second stationary sensor 114, which is arranged at a second height, may be aligned with a reflector (e.g., the second cart reflector 118). With the second stationary sensor 214 aligned and the first stationary sensor 212 blocked, the conveyor logic controller 110 may be configured to determine that the conveyor cart 102, which the stationary conveyor 104 is aligned with, is supporting a pallet or load to be unloaded onto the stationary conveyor 104. In this scenario, the conveyor logic controller 110 may be configured to instruct the stationary conveyor motor controller 208 to rotate the stationary conveyor rollers 304, via the stationary conveyor motor 206, to receive a load from the conveyor cart 102 at step 714.

Once the task to be performed has been determined by monitoring the respective heights of the sensors that are blocked and the sensors that are aligned, the rotation of the conveyor cart rollers 302 and the stationary conveyor roller 304 may be rotated substantially simultaneously to ensure that the load is transferred either from the conveyor cart 102 to the stationary conveyor 104 or from the stationary conveyor 104 to the conveyor cart 102.

The system and methods described herein enable the efficient determination of the alignment between a stationary conveyor and a movable conveyor, in addition to the task to be performed when the conveyors are aligned. For example, by determining the task to be performed (e.g., loading onto the movable conveyor or unloading from the movable conveyor) via the blocking and alignment of sensors at different heights, the decision making process for how to operate the conveyors may become more computationally efficient. In addition, the alignment and task determination may aid in making the loading and unloading process between the conveyors autonomous.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. An alignment and task indication system comprising:
   a conveyor cart including a first cart sensor, a second cart sensor, a first cart reflector, and a second cart reflector, wherein the first cart sensor and the second cart sensor are attached to a first side of the conveyor cart and the first cart reflector and the second cart reflector are attached to a second opposite side of the conveyor cart, and wherein the first cart sensor and the first cart reflector are arranged at a first height and the second cart sensor and the second cart reflector are arranged at a second height; and
   a stationary conveyor including a stationary sensor and a stationary reflector, whereby alignment of the stationary sensor with one of the first cart reflector and the second cart reflector and simultaneous alignment of the stationary reflector with one of the first cart sensor and the second cart sensor is configured to confirm alignment between the conveyor cart and the stationary conveyor, and
   wherein the one of the first cart sensor and the second cart sensor aligned with the stationary reflector is configured to determine if the stationary conveyor is an unloading location or a loading location.

2. The alignment and task indication system of claim 1, wherein the first cart sensor and the second cart sensor are retroreflective sensors.

3. The alignment and task indication system of claim 1, wherein the stationary sensor is a retroreflective sensor.

4. The alignment and task indication system of claim 1, wherein the conveyor cart includes a plurality of conveyor cart rollers and the stationary conveyor includes a plurality of stationary conveyor rollers.

5. The alignment and task indication system of claim 4, wherein the one of the first cart sensor and the second cart sensor aligned with the stationary reflector is configured to determine a rotational direction that the plurality of conveyor cart rollers and the plurality of stationary conveyor rollers rotate.

6. The alignment and task indication system of claim 1, wherein the stationary sensor and the stationary reflector are arranged on opposing sides of the stationary conveyor.

7. The alignment and task indication system of claim 1, wherein the conveyor cart is coupled to a material handling vehicle.

8. The alignment and task indication system of claim 1, wherein the conveyor cart is movable relative to the stationary conveyor.

9. An alignment and task indication system comprising:
   a conveyor cart including a plurality of conveyor cart rollers, a first cart sensor, a second cart sensor, a first cart reflector, and a second cart reflector, wherein the first cart sensor and the second cart sensor are attached to a first side of the conveyor cart and the first cart reflector and the second cart reflector are attached to a second opposite side of the conveyor cart, and wherein the first cart sensor and the first cart reflector are arranged at a first height and the second cart sensor and the second cart reflector are arranged at a second height; and a stationary conveyor including a plurality of stationary conveyor rollers, a stationary sensor, and a stationary reflector, whereby alignment of the stationary sensor with one of the first cart reflector and the second cart reflector and simultaneous alignment of the stationary reflector with one of the first cart sensor and the second cart sensor is configured to confirm alignment between the conveyor cart and the stationary conveyor, and wherein the one of the first cart sensor and the second cart sensor aligned with the stationary reflector is configured to determine a rotational direction that the plurality of conveyor cart rollers and the plurality of stationary conveyor rollers rotate.

10. The alignment and task indication system of claim 9, wherein the first cart sensor and the second cart sensor are retroreflective sensors.

11. The alignment and task indication system of claim 9, wherein the stationary sensor is a retroreflective sensor.

12. The alignment and task indication system of claim 9, wherein the stationary sensor and the stationary reflector are arranged on opposing sides of the stationary conveyor.

13. The alignment and task indication system of claim 9, wherein the conveyor cart is coupled to a material handling vehicle.

14. The alignment and task indication system of claim 9, wherein the conveyor cart is movable relative to the stationary conveyor.

15. A method of operating a movable conveyor, the movable conveyor including a plurality of conveyor rollers, a first cart sensor, a second cart sensor, a first cart reflector, and a second cart reflector, the first cart sensor and the first cart reflector being arranged at a first height and the second cart sensor and the second cart reflector being arranged at a second height, the method comprising:

moving the movable conveyor into alignment with a stationary conveyor, the stationary conveyor including a stationary sensor and a stationary reflector arranged on opposing sides thereof;

determining which of the first cart sensor or the second cart sensor is aligned with the stationary reflector;

upon determining that the first cart sensor is aligned with the stationary reflector, rotating the plurality of conveyor rollers in a first direction; and upon determining that the second cart sensor is aligned with the stationary reflector, rotating the plurality of conveyor rollers in a second direction.

16. The method of claim 15, wherein moving the movable conveyor into alignment with the stationary conveyor comprises:

instructing a material handing vehicle to move the movable conveyor coupled thereto.

17. The method of claim 15, further comprising:

confirming alignment between the movable conveyor and the stationary conveyor via simultaneous alignment between one of the first cart sensor and the second cart sensor and the stationary reflector and between the stationary sensor and at least one of the first cart reflector and the second cart reflector.

18. The method of claim 15, wherein rotating the plurality of conveyor rollers in the first direction comprises:

unloading a load from the movable conveyor onto the stationary conveyor; and wherein rotating the plurality of conveyor rollers in the second direction comprises:

loading a load from the stationary conveyor onto the movable conveyor.

19. The method of claim 15, further comprising:

upon determining that the first cart sensor is aligned with the stationary reflector, rotating a plurality of stationary conveyor rollers on the stationary conveyor in the first direction.

20. The method of claim 15, further comprising:

upon determining that the second cart sensor is aligned with the stationary reflector, rotating a plurality of stationary conveyor rollers on the stationary conveyor in the second direction.

* * * * *